(12) United States Patent
Chong

(10) Patent No.: US 6,629,177 B1
(45) Date of Patent: Sep. 30, 2003

(54) ARBITRATING REQUESTS ON COMPUTER BUSES

(75) Inventor: Lai Hock Chong, Island Glades Penang (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/472,052

(22) Filed: Dec. 27, 1999

(51) Int. Cl.⁷ .......................... G06F 13/38; G06F 13/14
(52) U.S. Cl. .................. 710/240; 710/244; 710/241; 710/243
(58) Field of Search .................. 710/112–125, 240–244

(56) References Cited

U.S. PATENT DOCUMENTS

| | | | | | |
|---|---|---|---|---|---|
| 5,265,257 A | * | 11/1993 | Simcoe et al. | ............... | 395/725 |
| 5,857,110 A | * | 1/1999 | Sakakibara et al. | ............. | 712/2 |
| 6,092,137 A | * | 7/2000 | Huang et al. | ................ | 710/111 |
| 6,363,445 B1 | * | 3/2002 | Jeddeloh | ...................... | 710/113 |
| 6,385,678 B2 | * | 5/2002 | Jacobs et al. | ................ | 710/113 |

* cited by examiner

Primary Examiner—Glenn A. Auve
Assistant Examiner—Trisha Vu
(74) Attorney, Agent, or Firm—Fish & Richardson P.C.

(57) ABSTRACT

Arbitration requests are received that belong to respective bus types. Each of the types is associated with a programmed value representing a potential number of times that requests of that type may win arbitration events that occur in a given time period. For at least some arbitration events that occur in the given time period, the invention updates a counter value for at least some of the types, the counter value for each of the types being set initially to the programmed value, and chooses a winning type in each of the arbitration events based on at least some of the counter values of the types of requests that are contending in the arbitration event.

24 Claims, 5 Drawing Sheets

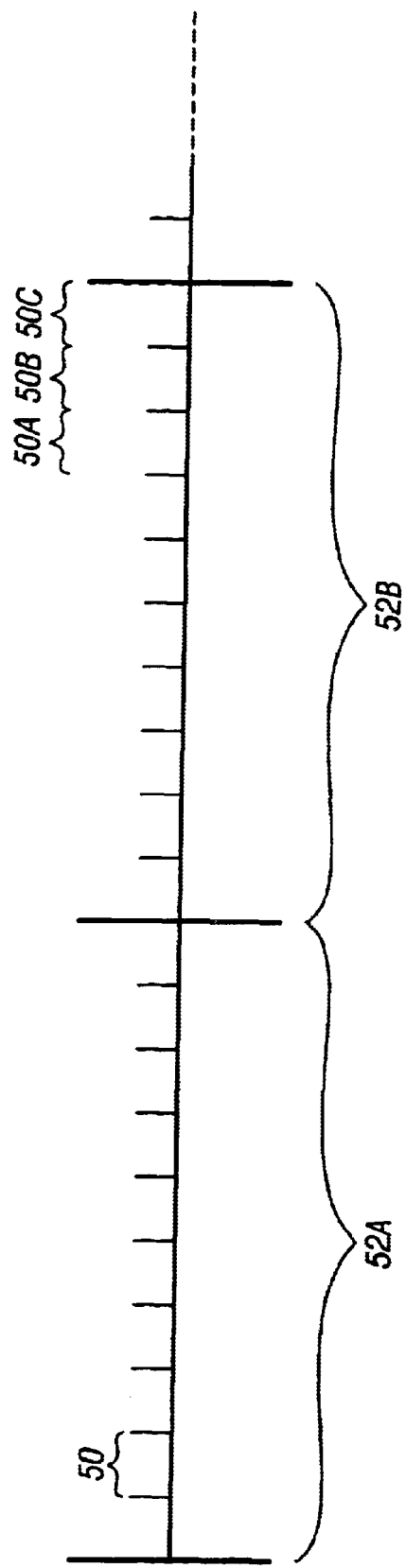

| | | First Time Slice - 52A | | | | | | | | | | Second Time Slice - 52B | | | | | | | | | | Third Time Slice - 52C | | | | | | | | | |
|---|---|---|---|---|---|---|---|---|---|---|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| 74 | TIME SLICE VALUE | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| 72 | AGP HIGH PRIORITY VALUE | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| 68 | REQUESTS REMAINING | 3 | 3 | 3 | 2 | 2 | 1 | 1 | 1 | 1 | 0 | 0 | 0 | 0 | 0 | 0 | 0 | 0 | 0 | 0 | 0 | 4 | 3 | 3 | 3 | 3 | 3 | 3 | 2 | 2 | 1 |
| 70 | CURRENT WEIGHT VALUE | 3 | 3 | 3 | 2 | 2 | 1 | 1 | 0 | 0 | 0 | 3 | 2 | 2 | 2 | 1 | 1 | 0 | 0 | 0 | 0 | 3 | 2 | 2 | 2 | 1 | 1 | 1 | 0 | 0 | 0 |
| 76 | WINNER | | | | X | | X | | | | | | | | X | | X | | | | | | | | X | | X | | | | |
| 72 | HUBLINK_A ISOCHRONOUS VALUE | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| 68 | REQUESTS REMAINING | 3 | 2 | 1 | 1 | 1 | 1 | 0 | 0 | 0 | 0 | 3 | 3 | 3 | 2 | 2 | 2 | 1 | 1 | 0 | 0 | 4 | 4 | 3 | 2 | 2 | 1 | 1 | 1 | 1 | 1 |
| 70 | CURRENT WEIGHT VALUE | 3 | 2 | 1 | 1 | 1 | 1 | 0 | 0 | 0 | 0 | 3 | 2 | 2 | 2 | 1 | 1 | 0 | 0 | 0 | 0 | 3 | 3 | 2 | 1 | 1 | 0 | 0 | 0 | 0 | 0 |
| 76 | WINNER | X | X | | | | | | | | | | X | | | | | | | | | | X | X | | | | | | | |
| 72 | HUBLINK_B ASYNCHRONOUS VALUE | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 |
| 68 | REQUESTS REMAINING | 2 | 2 | 2 | 2 | 1 | 1 | 1 | 1 | 0 | 0 | 3 | 2 | 2 | 2 | 2 | 2 | 1 | 1 | 0 | 0 | 2 | 1 | 1 | 1 | 1 | 1 | 1 | 1 | 1 | 0 |
| 70 | CURRENT WEIGHT VALUE | 2 | 2 | 2 | 2 | 1 | 1 | 1 | 1 | 0 | 0 | 2 | 2 | 2 | 2 | 1 | 1 | 1 | 1 | 0 | 0 | 2 | 1 | 1 | 1 | 1 | 0 | 0 | 0 | 0 | 0 |
| 76 | WINNER | | | | X | | | | X | | | X | | | | | X | | | | | | X | | | | X | | | | |
| 72 | AGP LOW PRIORITY VALUE | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 68 | REQUESTS REMAINING | 1 | 1 | 0 | 0 | 0 | 0 | 0 | 0 | 0 | 0 | 1 | 1 | 1 | 1 | 0 | 0 | 0 | 0 | 0 | 0 | 1 | 1 | 1 | 1 | 1 | 1 | 1 | 1 | 1 | 1 |
| 70 | CURRENT WEIGHT VALUE | 1 | 1 | 0 | 0 | 0 | 0 | 0 | 0 | 0 | 0 | 1 | 1 | 1 | 1 | 0 | 0 | 0 | 0 | 0 | 0 | 1 | 1 | 1 | 1 | 1 | 1 | 1 | 1 | 1 | 0 |
| 76 | WINNER | | X | | | | | | | | | | | | X | | | | | | | | | | | | | | | | X |
| 72 | HUBLINK_A ASYNCHRONOUS VALUE | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 68 | REQUESTS REMAINING | 1 | 1 | 1 | 1 | 1 | 1 | 1 | 0 | 0 | 0 | 1 | 1 | 1 | 1 | 1 | 1 | 1 | 0 | 0 | 0 | 0 | 0 | 0 | 0 | 0 | 0 | 0 | 0 | 0 | 0 |
| 70 | CURRENT WEIGHT VALUE | 1 | 1 | 1 | 1 | 1 | 1 | 1 | 0 | 0 | 0 | 1 | 1 | 1 | 1 | 1 | 1 | 1 | 0 | 0 | 0 | 0 | 0 | 0 | 0 | 0 | 0 | 0 | 0 | 0 | 0 |
| 76 | WINNER | | | | | | | X | | | | | | | | | | X | | | | | | | | | | | | | |
| 72 | AGP PCI VALUE | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 68 | REQUESTS REMAINING | 0 | 0 | 0 | 0 | 0 | 0 | 0 | 0 | 0 | 0 | 0 | 0 | 0 | 0 | 0 | 0 | 0 | 0 | 0 | 0 | 2 | 2 | 2 | 2 | 2 | 2 | 2 | 2 | 2 | 2 |
| 70 | CURRENT WEIGHT VALUE | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 76 | WINNER | | | | | | | | | | | | | | | | | | | | X | | | | | | | | | | |

ALL NUMERICAL ENTRIES REPRESENT STATUS AT THE BEGINNING OF EACH ARBITRATION EVENT

ARBITER CONTROL REGISTERS

| BITS | TYPE | DEFINITION |
|---|---|---|
| 31:25 | RO | RESERVED |
| 24:19 | RW | TRANSACTION TIME SLICE: NUMBER REPRESENTS THE NUMBER OF ARBITRATION EVENTS DEDICATED FOR I/O DEVICES. WHEN THE TIME SLICE HAS EXPIRED, ALL LOGGED EVENTS ARE RESET TO PRE-PROGRAMMED VALUE. |
| 18:15 | RW | AGP HIGH PRIORITY: WEIGHT FOR AGP EXPEDITE COMMANDS. NUMBER REPRESENTS THE NUMBER OF ARBITRATION EVENTS DEDICATED FOR S-UNIT EXPEDITE COMMENDS IN THE SUM OF BITS 18:0 OF THIS REGISTER. |
| 14:12 | RW | HUB_INTERFACE_A ISOCHRONOUS: WEIGHT FOR HUB_INTERFACE_A ISOCHRONOUS COMMANDS. NUMBER REPRESENTS THE NUMBER OF ARBITRATION EVENTS DEDICATED FOR L-UNIT ISOCHRONOUS IN THE SUM OF BITS 18:0 OF THIS REGISTER. |
| 11:9 | RW | HUB_INTERFACE_B ASYNCHRONOUS: WEIGHT FOR HUB_INTERFACE_B ASYNCHRONOUS COMMANDS. NUMBER REPRESENTS THE NUMBER OF ARBITRATION EVENTS DEDICATED FOR J-UNIT ASYNCHRONOUS IN THE SUM OF BITS 18:0 OF THIS REGISTER. |
| 8:6 | RW | AGP LOW PRIORITY: WEIGHT FOR NORMAL AGP COMMANDS. NUMBER REPRESENTS THE NUMBER OF ARBITRATION EVENTS DEDICATED FOR NORMAL S-UNIT COMMENDS IN THE SUM OF BITS 18:0 OF THIS REGISTER. |
| 5:3 | RW | HUB_INTERFACE_A ASYNCHRONOUS: WEIGHT FOR HUB_INTERFACE_A ASYNCHRONOUS COMMANDS. NUMBER REPRESENTS THE NUMBER OF ARBITRATION EVENTS DEDICATED FOR L-UNIT ASYNCHRONOUS IN THE SUM OF BITS 18:0 OF THIS REGISTER. |
| 2:0 | RW | AGP PCI: WEIGHT FOR AGP CYCLES USING PCI SEMANTICS. NUMBER REPRESENTS THE NUMBER OF ARBITRATION EVENTS DEDICATED FOR K-UNIT COMMENDS IN THE SUM OF BITS 18:0 OF THIS REGISTER. | ized # ARBITRATING REQUESTS ON COMPUTER BUSES

BACKGROUND

This invention relates to arbitrating requests on computer buses.

Computer buses carry data from one part of a computer to another. As shown in FIG. 1, input/output (I/O) buses 12 carry data from I/O units 10 such as keyboards, disk drives, and graphics devices. The I/O bus 12, e.g., a peripheral component interconnect (PCI) bus, carries the data through a bridge 14 to a system bus 16. The system bus 16 carries data and processing requests to and from the central processing unit (CPU) 18 and random access memory (RAM) 20.

Instead of traveling on an I/O bus 12, graphics data and processing requests may travel on a special channel, e.g., an accelerated graphics port (AGP) 22. AGP 22 carries data and processing requests, in the order it receives it, from a graphics device 24 directly to the CPU 18.

SUMMARY

In general, in one aspect, the invention features receiving arbitration requests belonging to respective bus types and associating with each of the types a programmed value representing a potential number of times that requests of that type may win arbitration events that occur in a given time period. For at least some arbitration events that occur in the given time period, the invention updates a counter value for at least some of the types, the counter value for each of the types being set initially to the programmed value, and chooses a winning type in each of the arbitration events based on at least some of the counter values of the types of requests that are contending in the arbitration event.

Other advantages and features will become apparent from the following description and from the claims.

BRIEF DESCRIPTION OF THE DRAWINGS

FIG. 3 is a timeline of an arbitration system.

FIG. 4 is a chart of results from an arbitration system.

FIG. 6 is a table of registers.

DESCRIPTION

Figure 2:
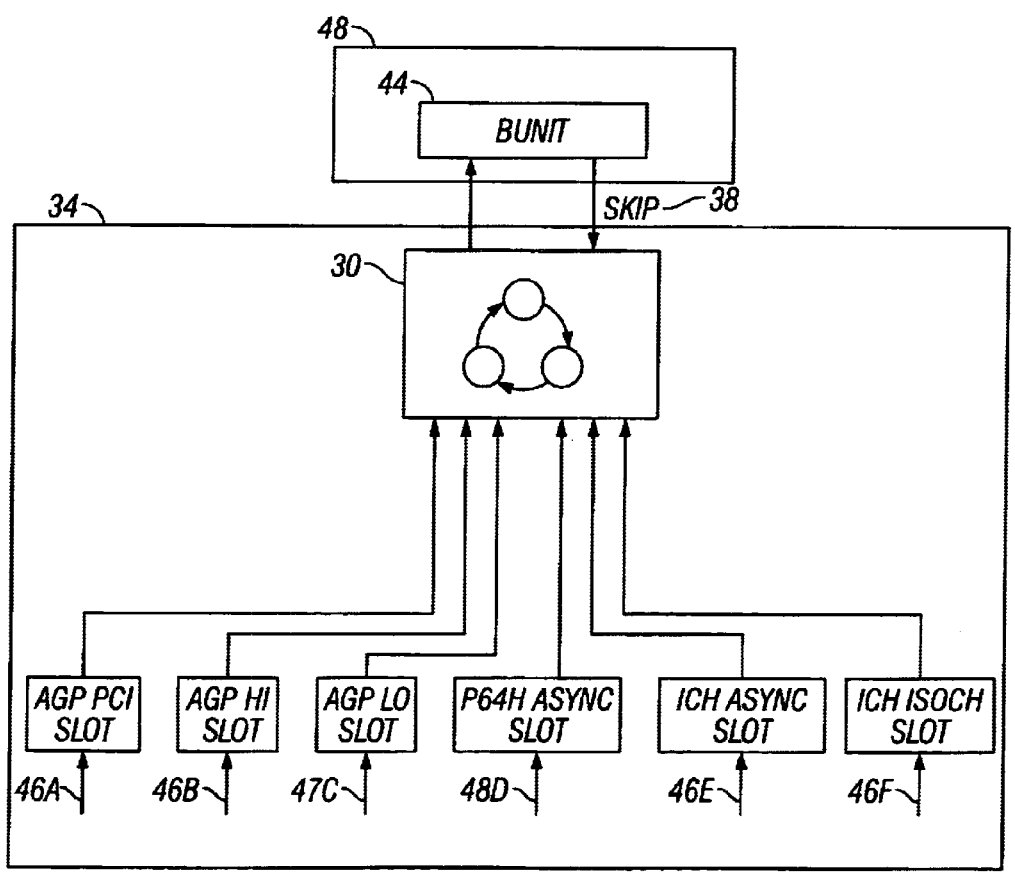
FIG. 2 is a diagram of an arbitration system in accordance with an implementation of the invention.

In a specific example shown in FIG. 2, an arbitration scheme 30 helps set the order in which various streams of I/O unit processing requests 46a–f associated with respective arbiter control registers 32a–f are permitted to gain access to a buffer unit (B-unit) 44 through which the requests are served by a processor 48. The arbiter control registers 32a–f hold integer weight values which indicate the potential number of times that requests belonging to their respective streams of requests 46a–f may gain access to the B-unit 44 in a given time period. As shown in FIG. 3, in each of a sequence of arbitration events 50, the scheme 30 chooses one arbiter control register 32a–f associated with an active type of request 46a–f. A type of request 46a–f is active if there is at least one request of that type that needs processing. An active request 46a–f of the type associated with the winning arbiter control register 32a–f is put in a pipeline in the arbiter 30 to await access to the B-unit 44, where it may be processed.

As shown in FIG. 4, the arbitration scheme 30 randomly chooses one arbiter control register 32a–f in each arbitration event 50a, 50b, 50c, etc. The winner is denoted by an "X" in a "Winner" row 76 for each column (each arbitration event 50) in each time slice 52a, 52b, 52c, etc. The winner of each arbitration event 50 is associated with a type of active request 46a–f, as indicated in "Requests Remaining" rows 68.

For example, if no eligible arbiter control register 32a–f has a non-zero current weight value, shown in "Current Weight Value" rows 70, the arbiter control register 32a–f ranked highest in a fixed or programmed priority scheme wins arbitration. A preferred fixed priority scheme is, from highest to lowest priority, Hublink_A Isochronous (register 32f), AGP High Priority (register 32b), Hublink_B Asynchronous (register 32e), AGP Low Priority (register 32c), Hublink_A Asynchronous (register 32d), and AGP PCI (register 32a). For example, in arbitration events 50a–d, the winning arbiter control registers 32a–f each held a weight value of zero, shown in their respective rows 70, but won arbitration under this preferred priority scheme.

The B-unit 44 may reject the request 46a–f it receives from the pipeline in a skipping action 38, thereby skipping that request 46a–f entirely or swapping it with the next request 46a–f in the pipeline. Swapping can occur only if the two requests 46a–f are of different types. After each time slice, the current weight values (in rows 70) in the arbiter control registers 32a–f are reset to their pre-programmed values (in rows 72), the time slice value (in row 74) in the time slice register 36 resets to zero, and the next time slice begins. Any requests 46a–f remaining in rows 68 at the end of a time slice, e.g., time slice 52a, carry over to the next time slice, e.g., time slice 52b, and are added to any new requests 46a–f.

Figure 1:
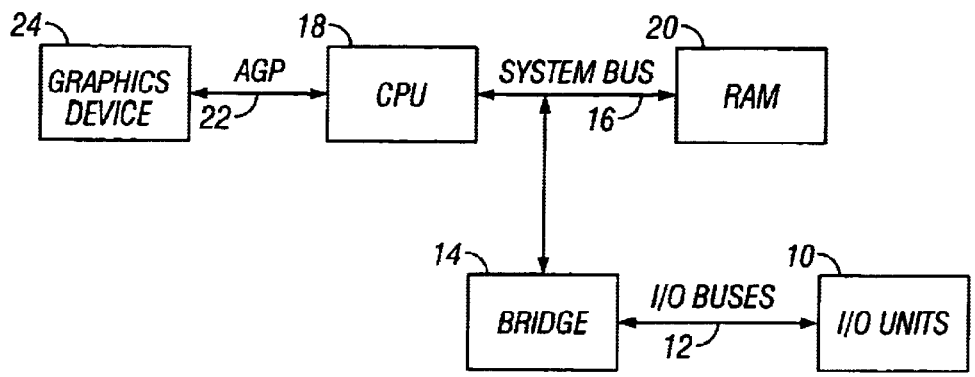
FIG. 1 is a block diagram of a computer system.
Figure 5:
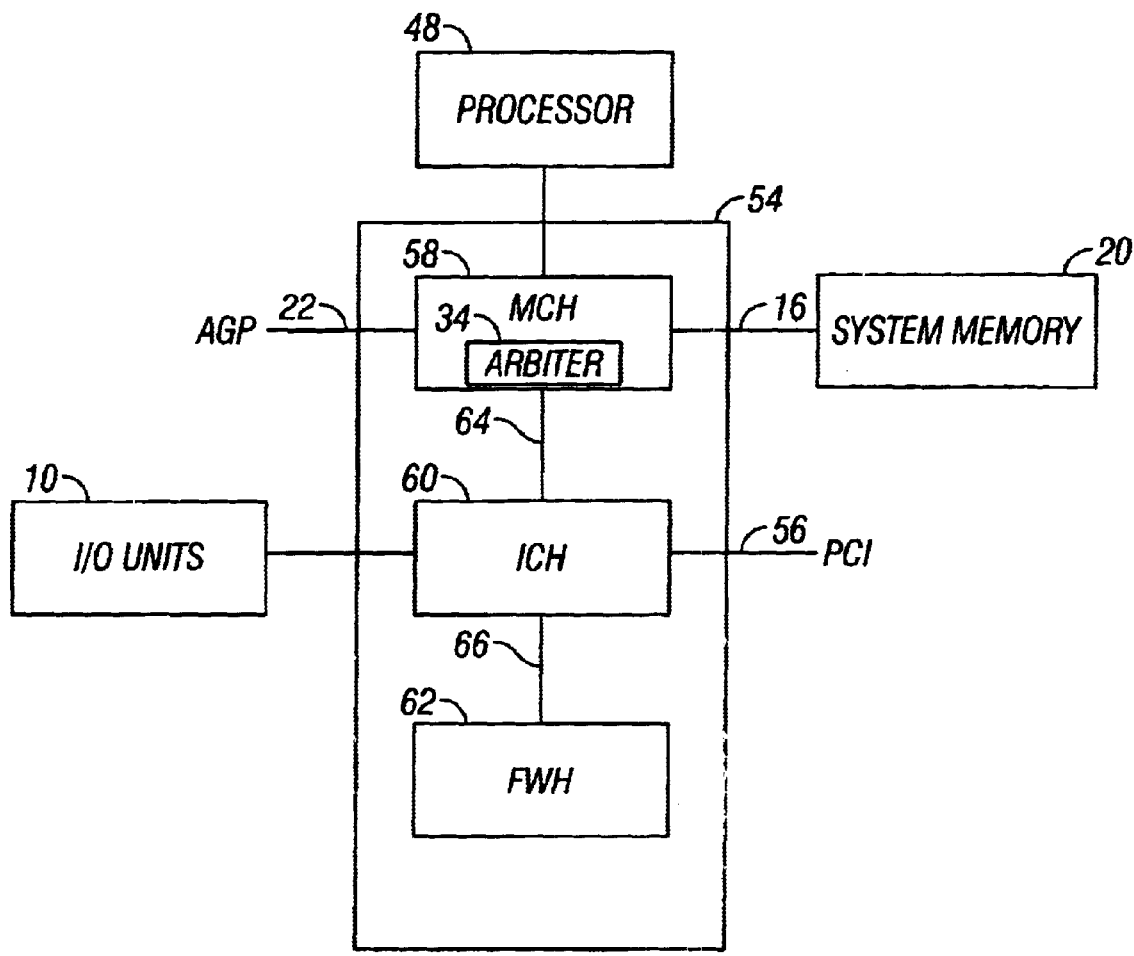
FIG. 5 is a block diagram of a computer system.

As shown in FIG. 5, the arbitration scheme 30 is part of an arbiter 34 located in a chipset 54, e.g., a graphics device 24 (FIG. 1). Generally, the chipset 54 provides the processor 48 (e.g., the CPU 18 via the B-unit 44) with data and processing requests traveling on buses such as the system bus 16, the PCI bus 56, and the AGP 22. The chipset 54 includes three hubs (connection points between devices) 58, 60, 62. The memory controller hub (MCH) 58 provides an interface for the processor 48, system memory 20, and graphics data on the AGP 22. The I/O controller hub (ICH) 60 handles data and processing requests coming from the I/O units 10. A hub interface A 64 connects the MCH 58 and the ICH 60. The firmware hub (FWH) 62 stores system and video BIOS (basic I/O system) software containing instructions on how to perform I/O functions and a random number generator (hardware that generates random numbers for use in, for example, encryption).

The arbiter 34 includes one thirty-two bit register, seen in FIG. 6, containing the three-bit or four-bit arbiter control registers 32a–f in the read/write bits zero to eighteen. Bits zero to two contain arbiter control register 32a, the AGP/PCI register, holding the weight value for requests 46a, requests from the AGP 22 using PCI 56 semantics. Bits three to five contain arbiter control register 32d, the Hub_Interface_A Asynchronous register, holding the weight value for requests 46e, asynchronous requests (ones not occurring at regular intervals) on the hub interface A 64. Bits six to eight contain arbiter control register 32c, the AGP Low Priority register, holding the weight value for requests 46c, low priority requests on the AGP 22. Bits nine to eleven contain arbiter control register 32e, the Hub_Interface_B Asynchronous register, holding the weight value for requests 46e, asynchronous requests from the MCH 58. Bits twelve to fourteen contain arbiter control register 32f, the Hub_Interface_A Isochronous register, holding the weight value for requests 46f, isochronous requests (ones occurring at regular intervals) on the hub interface A 64. Bits fifteen to eighteen contain arbiter control register 32b, the AGP High Priority register, holding the weight value for requests 46b, high priority requests on the AGP 22. Read/write bits nineteen to twenty-four contain a time slice register 36, holding a value equal to the total number of arbitration events 50 that have occurred in the instant time slice. That number is the sum of the weight values in the arbiter control registers 32a–f (the total number of arbitration events 50 dedicated for I/O units 10). Bits twenty-five to thirty-one are read-only reserved bits.

Before arbitration begins (e.g., at time slice 52a), each arbiter control register 32a–f is pre-programmed with an integer weight value in its three-bit or four-bit field (multiple registers may have the same value). For example, arbiter control register 32f could be given a value of seven by programming "111" into its field. In the example in FIG. 4, arbiter control register 32a has a pre-programmed weight value of zero, arbiter control registers 32c–d each have a pre-programmed weight value of one, arbiter control register 32e has a pre-programmed weight value of two, and arbiter control registers 32b and 32f each have a pre-programmed weight value of three, for a total of ten arbitration events 50 per time slice. The pre-programmed weight values in the arbiter control registers 32a–f represent their (and their associated requests 46a–f) potential winning percentages in each time slice. So in the FIG. 4 example, arbiter control registers 32c–d each potentially have a one-tenth chance of winning an arbitration event 50 in each time slice. Not all arbiter control registers 32a–f may be associated with active requests 46a–f in every arbitration event 50, so their actual winning percentages may be higher or lower since each arbitration event 50 always chooses one arbiter control register 32a–f. For example, in time slice 52b, register 32c won three arbitration events 50 despite its pre-programmed weight value of two (row 72), while register 32e won no arbitration events 50 despite its pre-programmed weight value of one (row 72).

During arbitration, the current weight values of arbiter control registers 32a–f are used because weight values can change from one arbitration event 50 to the next. Each arbiter control register 32a–f begins at its pre-programmed weight value. The value in time slice register 36 begins at zero, incrementing by one after each arbitration event 50. When the value in time slice register 36 reaches the sum of all the pre-programmed weight values in arbiter control registers 32a–f, the current time slice expires. At the end of each arbitration event 50, the current weight value in the winning arbiter control register 32a–f decreases by one, never falling below zero, indicating its win and decreasing its chances of winning future arbitration events 50 during the same time slice.

Other embodiments are within the scope of the following claims.

What is claimed is:

1. A method, comprising:
 receiving arbitration requests belonging to respective different kinds of bus types;
 associating with each of the types a programmed value representing a potential number of times that requests of that type may win arbitration events that occur in a given time period;
 for at least some arbitration events that occur in the given time period, updating a counter value for at least some of the types, the counter value for each of the types being set initially to the programmed value; and
 randomly choosing one of said bus types, which has a programmed value representing that the number of times that said one bus type has won arbitrations has not exceeded the potential number of times, as a winning type in each of the arbitration events.

2. The method of claim 1 in which the number of arbitration events occurring in the given time period comprises the sum of the programmed values of all of the types.

3. The method of claim 1 in which the updating comprises decrementing the counter value of the winning type.

4. The method of claim 1 in which the counter values for the types are reset to the programmed values for a subsequent given time period.

5. The method of claim 1 in which a request of the winning type is queued for service.

6. The method of claim 5 in which the queued request is deferred in favor of another request.

7. The method of claim 1 further comprising, if no types have a non-zero counter value, choosing a winning type having a zero counter value.

8. The method of claim 7 further comprising choosing the winning type based at least in part on a priority scheme of types.

9. An article comprising a computer-readable medium which stores computer-executable instructions, the instructions causing a computer to:
 receive arbitration requests belonging to respective different kinds of bus types;
 associate with each of the types a programmed value representing a potential number of times that requests of that type may win arbitration events that occur in a given time period;
 for at least some arbitration events that occur in the given time period, update a counter value for at least some of the types, the counter value for each of the types being set initially to the programmed value; and
 randomly choose one of said bus types, which has a programmed value representing that the number of times that said one bus type has won arbitrations has not exceeded the potential number of times, as a winning type in each of the arbitration events.

10. The article of claim 9 in which the number of arbitration events occurring in the given time period comprises the sum of the programmed values of all of the types.

11. The article of claim 9 in which the updating comprises decrementing the counter value of the winning type.

12. The article of claim 9 in which the counter values for the types are reset to the programmed values for a subsequent given time period.

13. The article of claim 9 in which a request of the winning type is queued for service.

14. The article of claim 13 in which the queued request is deferred in favor of another request.

15. The article of claim 9 further comprising instructions causing a computer to, if no types haves a non-zero counter value, choose a winning type having a zero counter value.

16. The article of claim 15 further comprising instructions causing a computer to choose the winning type based at least in part on a priority scheme of types.

17. A computer system, comprising:

a hub to receive arbitration requests belonging to respective bus types; and an arbiter to associate with each of the types a programmed value representing a potential number of times that requests of that type may win arbitration events that occur in a given time period, to update, for at least some arbitration events that occur in the given time period, a counter value for at least some of the types, the counter value for each of the types being set initially to the programmed value, and to randomly choose one of said bus types, which has a programmed value representing that the number of times that said one bus type has won arbitrations has not exceeded the potential number of times, as a winning type in each of the arbitration events.

18. The computer system of claim 17 in which the number of arbitration events occurring in the given time period comprises the sum of the programmed values of all of the types.

19. The computer system of claim 17 in which the updating comprises decrementing the counter value of the winning type.

20. The computer system of claim 17 in which the counter values for the types are reset to the programmed values for a subsequent given time period.

21. The computer system of claim 17 in which a request of the winning type is queued for service.

22. The computer system of claim 21 in which the queued request is deferred in favor of another request.

23. The computer system of claim 17 in which the arbiter may, if no types have a non-zero counter value, choose a winning type having a zero counter value.

24. The computer system of claim 23 in which the arbiter chooses the winning type based at least in part on a priority scheme of types.

* * * * *